United States Patent
Lim et al.

(10) Patent No.: US 9,787,505 B2
(45) Date of Patent: Oct. 10, 2017

(54) TAP EMBEDDED DATA RECEIVER AND DATA TRANSMISSION SYSTEM HAVING THE SAME

(71) Applicant: SAMSUNG ELECTRONICS CO., LTD., Suwon-si, Gyeonggi-do (KR)

(72) Inventors: Hyun-Wook Lim, Seoul (KR); Sung-Won Choi, Hwaseong-si (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 1 day.

(21) Appl. No.: 14/979,784

(22) Filed: Dec. 28, 2015

(65) Prior Publication Data

US 2016/0241421 A1 Aug. 18, 2016

(30) Foreign Application Priority Data

Feb. 16, 2015 (KR) .................. 10-2015-0023584

(51) Int. Cl.
| | | |
|---|---|---|
| *H03H 7/30* | (2006.01) | |
| *H03H 7/40* | (2006.01) | |
| *H03K 5/159* | (2006.01) | |
| *H04L 25/03* | (2006.01) | |
| *H04L 25/02* | (2006.01) | |

(52) U.S. Cl.
CPC .... *H04L 25/03057* (2013.01); *H04L 25/0272* (2013.01)

(58) Field of Classification Search
CPC ....... H04L 25/03057; H04L 2025/0349; H04L 2025/03617; H04L 2025/03503; H04L 25/03038

USPC ................. 375/229–236, 316–352, 354–376
See application file for complete search history.

(56) References Cited

U.S. PATENT DOCUMENTS

| | | | | |
|---|---|---|---|---|
| 6,363,112 B1* | 3/2002 | Azadet | .............. | H04L 25/03057 375/232 |
| 6,480,233 B1* | 11/2002 | Limberg | .................. | H04N 5/21 348/21 |
| 6,819,616 B2* | 11/2004 | La | ........................ | G11C 7/1066 365/219 |
| 7,230,985 B2* | 6/2007 | Park | .................. | H04L 25/03878 326/93 |
| 7,466,785 B2* | 12/2008 | Sanduleanu | ............ | H03L 7/087 375/371 |

(Continued)

OTHER PUBLICATIONS

Lim, Hyun-Wook, et al., "A 5.8Gb/s Adaptive Integrating Duobinary-Based DFE Receiver for Multi-Drop Memory Interface", 2015 IEEE International Solid-State Circuits Conference, pp. 182-183, Feb. 22-26, 2015

(Continued)

*Primary Examiner* — James M Perez
(74) *Attorney, Agent, or Firm* — F. Chau & Associates, LLC (57) ABSTRACT

A data receiver includes a plurality of samplers, each of the samplers amplifies a difference between a first reference voltage and an input voltage and amplifies a difference between a second reference voltage and the input voltage. Operational paths of the samplers are differently controlled according to a level of second data corresponding to the second reference voltage, and first data corresponding to the first reference voltage is past data preceding current data and the second data is past data preceding the first data in the sampler.

17 Claims, 8 Drawing Sheets

(56) References Cited

U.S. PATENT DOCUMENTS

| | | | |
|---|---|---|---|
| 7,606,300 B2* | 10/2009 | Lim | H04L 1/0047 375/229 |
| 7,697,603 B1 | 4/2010 | Wang et al. | |
| 7,697,606 B2* | 4/2010 | Ungerboeck | H03M 7/40 341/65 |
| 7,697,628 B2* | 4/2010 | Choi | H04L 25/085 341/55 |
| 7,822,111 B2* | 10/2010 | Sohn | H04L 7/0058 375/231 |
| 7,822,114 B2* | 10/2010 | Bulzacchelli | H04L 25/03057 375/229 |
| 7,826,549 B1* | 11/2010 | Aggarwal | H03C 1/60 332/170 |
| 7,974,375 B2* | 7/2011 | Kim | H03L 7/087 327/235 |
| 7,986,745 B2* | 7/2011 | Hosaka | H03M 5/16 341/58 |
| 8,064,556 B2* | 11/2011 | Subrahmanya | H04B 1/71057 375/148 |
| 8,223,904 B2* | 7/2012 | Sampath | H04B 7/0817 375/232 |
| 8,619,848 B2* | 12/2013 | Jiang | H04L 25/03057 375/220 |
| 8,675,714 B2* | 3/2014 | Cheung | H04L 25/03885 375/214 |
| 8,837,652 B2* | 9/2014 | Stern | H04L 5/0039 375/133 |
| 8,958,504 B2* | 2/2015 | Warke | H04L 27/0014 375/235 |
| 8,995,594 B2* | 3/2015 | Kesling | H04B 1/38 375/220 |
| 9,008,168 B2* | 4/2015 | Miller | H04N 5/268 375/232 |
| 9,191,127 B2* | 11/2015 | Koli | H03H 19/008 |
| 9,237,041 B1* | 1/2016 | An | H04L 25/03267 |
| 9,300,461 B2* | 3/2016 | Akita | H03L 7/087 |
| 9,379,920 B1* | 6/2016 | Liao | H04L 27/01 |
| 9,602,184 B2* | 3/2017 | Honda | H01Q 3/26 |
| 2002/0080898 A1* | 6/2002 | Agazzi | H03M 1/0624 375/355 |
| 2002/0158678 A1* | 10/2002 | Sanduleanu | H03H 11/22 327/258 |
| 2003/0035503 A1* | 2/2003 | Sanduleanu | H03L 7/07 375/376 |
| 2003/0179619 A1* | 9/2003 | La | G11C 7/1066 365/200 |
| 2003/0222689 A1* | 12/2003 | Burdick | H03K 5/1504 327/170 |
| 2005/0088215 A1* | 4/2005 | Suissa | H04L 25/061 327/307 |
| 2005/0265440 A1* | 12/2005 | Sohn | H03L 7/0814 375/233 |
| 2006/0034410 A1* | 2/2006 | Sanduleanu | H03L 7/087 375/376 |
| 2006/0050829 A1* | 3/2006 | Sanduleanu | H03D 13/003 375/376 |
| 2006/0076981 A1* | 4/2006 | Sanduleanu | H03D 13/00 327/3 |
| 2006/0176947 A1* | 8/2006 | Lim | H04L 1/0047 375/232 |
| 2006/0192594 A1* | 8/2006 | Sanduleanu | H03D 13/004 327/47 |
| 2006/0193414 A1* | 8/2006 | Gregorius | G11C 7/22 375/355 |
| 2006/0208769 A1* | 9/2006 | Sanduleanu | G01R 25/005 327/94 |
| 2007/0019765 A1* | 1/2007 | Gee | H04L 1/20 375/354 |
| 2007/0021933 A1* | 1/2007 | Sanduleanu | H03D 13/003 702/72 |
| 2008/0032652 A1* | 2/2008 | Zhao | G11B 20/10009 455/226.4 |
| 2008/0212666 A1* | 9/2008 | Kuchi | H04B 7/0413 375/231 |
| 2009/0251404 A1* | 10/2009 | Hwang | G09G 3/344 345/107 |
| 2010/0097258 A1* | 4/2010 | Koli | H03H 15/00 341/155 |
| 2010/0151900 A1* | 6/2010 | Koli | G11C 27/024 455/550.1 |
| 2012/0133661 A1* | 5/2012 | Lee | G09G 3/3275 345/558 |
| 2012/0200334 A1* | 8/2012 | Connell | H03D 7/1441 327/359 |
| 2013/0015901 A1* | 1/2013 | Kitsunezuka | H03D 7/1441 327/356 |
| 2015/0180646 A1* | 6/2015 | Zerbe | H04L 25/03038 375/233 |
| 2015/0358005 A1* | 12/2015 | Chen | H03K 5/003 375/233 |
| 2016/0005590 A1* | 1/2016 | Park | G03F 7/70633 700/114 |
| 2016/0065394 A1* | 3/2016 | Sindalovsky | H04L 25/03012 375/371 |
| 2016/0241421 A1* | 8/2016 | Lim | H04L 25/03057 |
| 2016/0241422 A1* | 8/2016 | Akita | H04B 3/10 |

OTHER PUBLICATIONS

Chi, Hyung-Joon, et al., "A Single-Loop SS-LMS Algorithm With Single-Ended Integrating DFE Receiver for Multi-Drop DRAM Interface", IEEE J. Solid-State Circuits, vol. 46, No. 9, pp. 2053-2063, Sep. 2011.

Sinsky, Jeffrey H., et al., "High-Speed Electrical Backplane Transmission Using Duobinary Signaling", IEEE Trans. Microwave Theory and Techniques, vol. 53, No. 1, pp. 152-159, Jan. 2005.

Schinkel, Daniel, et al., "A Double-Tail Latch-Type Voltage Sense Amplifier with 18ps Setup+Hold Time", ISSCC Dig. Tech. Papers, pp. 314-315, 605, Feb. 2007.

* cited by examiner

TAP EMBEDDED DATA RECEIVER AND DATA TRANSMISSION SYSTEM HAVING THE SAME

CROSS-REFERENCE TO RELATED APPLICATION

This application claims priority under 35 U.S.C. §119 to Korean Patent Application No. 10-2015-0023584 filed on Feb. 16, 2015, the disclosure of which is incorporated by reference in its entirety herein.

BACKGROUND

Technical Field

Embodiments of the inventive concept relate to a data receiver, and more particularly, to a decision feedback equalizer of a data receiver.

Discussion of Related Art

In systems having a high speed data transfer rate, the number of cases in which chip-to-chip data transfer rates are limited to data bandwidths of transmission channels rather than data bandwidths of input/output (I/O) circuits is steadily increasing. While the chip-to-chip data transfer rates have increased, so has the amount of distortion in a signal which passes through a channel.

Thus, there is a need for the development of a solution that prevents the signal distortion phenomenon in a receiver.

SUMMARY

At least one embodiment of the inventive concept provides a data receiver having a tap embedded equalizer and a data transmission system having the same.

According to an exemplary embodiment of the inventive concept, a data receiver includes a plurality of samplers, each of the samplers amplifies a difference between a first reference voltage and an input voltage, and amplifies a difference between a second reference voltage and the input voltage. Operational paths of the samplers are differently controlled according to a level of second data corresponding to the second reference voltage, and first data corresponding to the first reference voltage is previous data preceding current data and the second data is past data preceding the first data in the sampler.

In an embodiment, the sampler includes a pair of first transistors which receive a difference between the first reference voltage and the second reference voltage, a pair of second transistors which receive a difference of the input signal, and a pair of third transistors which receive the difference between the first reference voltage and the second reference voltage, and the pair of the first transistors and the pair of the second transistors are alternately enabled according to a level of the second data.

In an embodiment, the sampler further includes an amplifier which detects a comparison result of each pair of the transistors, and a latch unit.

In an embodiment, the amplifier includes a plurality of transistors and inverters.

In an embodiment, the latch unit includes an SR latch circuit.

According to an exemplary embodiment of the inventive concept, a data transmission system includes a transmitter which transmits the data, a receiver which receives data, and a data transmission channel provided between the transmitter and the receiver, and the receiver includes a plurality of look-ahead samplers in which a tap is embedded, and the receiver is provided so as to consider a level of $n^{th}$ data received as a feedback signal when a plurality of decisions are made using output of current input data.

In an embodiment, the system includes a first path controller which controls output of even-numbered data, and a second path controller which controls output of odd-numbered data.

In an embodiment, the first path controller includes a first sampler which is controlled by a main clock signal, receives an $n^{th}$ reference voltage of the $n^{th}$ data and an input signal and a first reference voltage, and determines an offset voltage of current data, a first latch block which latches and transmits output of the first sampler, a first tap block configured to receive output of the first latch block as a feedback signal and including a coefficient according to a location of each data, and a first adder which adds all output of the first tap block.

In an embodiment, the second path controller includes a second sampler which is controlled by a sub clock signal, receives an $n^{th}$ reference voltage of $n^{th}$ data and an input signal and a first reference voltage to determine an offset voltage of current data, a second latch block which latches and transmits output of the second sampler, a second tap block configured to receive output of the second latch block as a feedback signal and including a coefficient according to a location of each data, and a second adder which adds all output of the second tap block.

In an embodiment, the first sampler includes a first tap embedded sampler and a second tap embedded sampler which are controlled and selected by an output signal of the second path controller, and a first multiplexer which selects one output among outputs of the first and second tap embedded samplers.

In an embodiment, the second sampler includes a third tap embedded sampler and a fourth tap embedded sampler which are controlled and selected by an output signal of the first path controller, and a second multiplexer which selects one output among outputs of the third and fourth tap embedded samplers.

In an embodiment, each of the first and second tap embedded samplers include first and second tap receivers which receive the $n^{th}$ data, wherein one of the first and second tap receivers receives an inversed level of the other, and an input signal receiver which receives the input signal, and one of the first and second tap receivers and the input signal receiver are enabled according to the level of the $n^{th}$ data.

In an embodiment, each of the first and second tap receivers receive a difference between the first reference voltage and the $n^{th}$ reference voltage of the $n^{th}$ data.

In an embodiment, each of the third and fourth tap embedded samplers include third and fourth tap receivers which receive the $n^{th}$ data, wherein one of the third and fourth tap receivers receives an inversed level of the other, and an input signal receiver which receives the input signal, and one of the third and fourth tap receivers and the input signal receiver are enabled according to the level of the $n^{th}$ data.

In an embodiment, each of the third and fourth tap receivers receive a difference between the first reference voltage and the $n^{th}$ reference voltage of the $n^{th}$ data.

According to an exemplary embodiment of the inventive concept, a data receiver includes a plurality of samplers supporting a half-rate receiving method, a first path controller which controls output of even-numbered data, and a second path controller which controls output of odd-numbered data, and each of the first and second path controllers provides a tap operation on $n^{th}$ data into the plurality of samplers as a feedback signal to be enabled.

In an embodiment, when the first path controller comprises a first sampler and the second path controller comprises a second sampler, the first sampler includes first and second tap embedded samplers and a first multiplexer, and the second sampler includes third and fourth tap embedded samplers and a second multiplexer.

In an embodiment, a selection of the first and second tap embedded samplers is controlled by an output signal of the second multiplexer, and a selection of the third and fourth tap embedded samplers is controlled by an output signal of the first multiplexer.

In an embodiment, each of the first and second tap embedded samplers include first and second tap receivers which receive the $n^{th}$ data, wherein one of the first and second tap receivers receives an inversed level of the other, and an input signal receiver which receives an input signal, and one of the first and second tap receivers in addition to the input signal receiver is enabled according to the level of the $n^{th}$ data.

In an embodiment, each of the third and fourth tap embedded samplers include third and fourth tap receivers which receive the $n^{th}$ data, wherein one of the third and fourth tap receivers receives an inversed level of the other, and an input signal receiver which receives an input signal, and one of the third and fourth tap receivers and the input signal receiver are enabled according to the level of the $n^{th}$ data.

According to an exemplary embodiment of the inventive concept, a sampler is provided including a differential input unit, an amplifier, and a latch unit. The differential input unit includes first through third receivers. The amplifier amplifies output of the differential input unit to generate an amplified result. The latch unit latches the amplified result. The sampler applies a data signal of a high level to turn off the third receiver and turn on the first and second receivers, and the sampler applies the data signal of a low level to turn on the third receiver and turn off the first and second receiver.

In an embodiment, the sampler applies the data signal to the first receiver and an inverted version of the data signal to the third receiver. In an embodiment, the sampler applies a differential input signal to the second receiver. In an embodiment, the sampler applies a differential reference voltage to the first receiver and the third receiver. In an embodiment, the latch unit is an SR latch circuit.

BRIEF DESCRIPTION OF THE DRAWINGS

The inventive concept will now be described more fully with reference to the accompanying drawings in which some exemplary embodiments are shown. In the drawings, like reference characters refer to the same parts throughout the different views. The drawings are not necessarily to scale. In the drawings.

DETAILED DESCRIPTION OF THE EXEMPLARY EMBODIMENTS

Hereinafter, exemplary embodiments of the inventive concept will be described in detail with reference to the accompanying drawings. While the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept.

It will be understood that when an element is referred to as being "connected" or "coupled" to another element, it can be directly connected or coupled to the other element or intervening elements may be present. As used herein, the singular forms "a," "an," and "the" are intended to include the plural forms as well, unless the context clearly indicates otherwise.

Hereinafter, exemplary embodiments of the inventive concept will be described with reference to the accompanying drawings.

Figure 1:
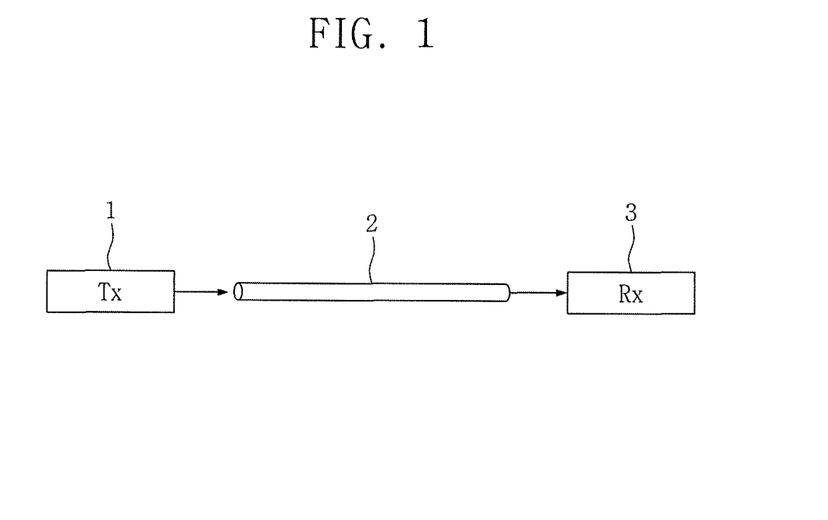
FIG. 1 is a schematic view showing a typical configuration between a transmitter and a receiver.

FIG. 1 is a schematic view showing a typical configuration between a transmitter (Tx) and a receiver (Rx).

Referring to FIG. 1, a transmission channel 2 is provided between the Tx 1 and the Rx 3.

When data is transmitted from the Tx 1 to the Rx 3, the data may be transmitted through the transmission channel 2. Ideally, the data should be transmitted from the Tx 1 to the Rx 3 in a state without loss, however, practically, this does not happen. For example, when Tx 1 transmits first N bit data without loss, second N bit data is received by the Rx 3 having a same value as the first N bit data. A digital pulse signal in the data transmitted by the Tx 1 may be distributed or spread in a Gaussian form when the signal reaches the Rx 3 due to a transfer function caused by a relatively long length of the transmission channel 2 or a material characteristic of the transmission channel 2.

For example, the Tx 1 may be a microprocessor, the transmission channel 2 may be a copper wire on a printed circuit board (PCB), and the Rx 3 may be another processor or a memory circuit.

Figure 2:
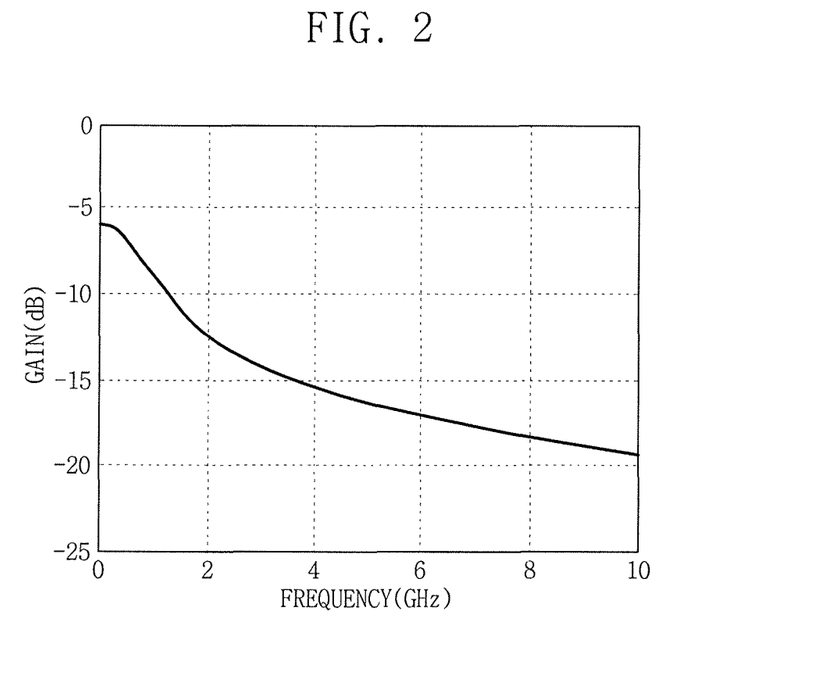
FIG. 2 is a graph showing a relationship between a frequency and gain of a signal.

FIG. 2 is a graph showing a relationship between a frequency and gain of a signal.

Referring to FIG. 2, an X-axis denotes the frequency and a Y-axis denotes the gain.

As shown in FIG. 2, it may be seen that the gain of the signal is significantly reduced as the frequency is increased. That is, a low frequency signal such as a direct current (DC) component may have a good transmission characteristic, however, a signal attenuation phenomenon may result from inter-symbol interference (ISI) when a high frequency signal is transmitted. An equalizer may be used as one of the methods for removing ISI of signals in a receiving and transmitting system.

Figure 3:
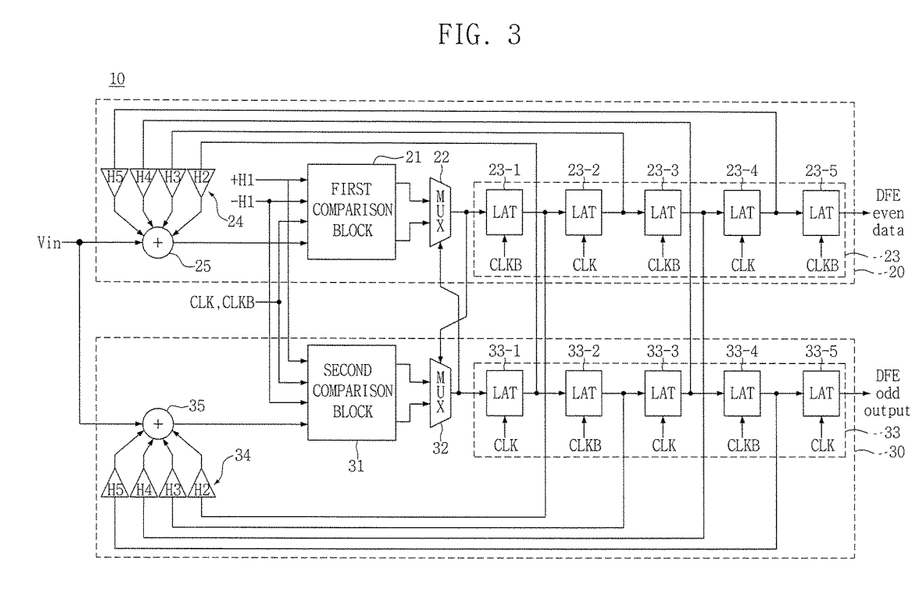
FIG. 3 is a block diagram of a look-ahead decision feedback equalizer (DFE) which is one of the equalizers of a receiver.

FIG. 3 is a block diagram of a look-ahead decision feedback equalizer (hereinafter, referred to as a look-ahead DFE), which is one of the equalizers of a receiver.

Referring to FIG. 3, the look-ahead DFE 10 includes a first path controller 20 and a second path controller 30.

Here, a half-rate receiving method using a main clock signal CLK and a sub clock signal CLKB of a clock signal are illustrated, and the first path controller 20 and the second path controller 30 support the method.

Since operational and structural principles of the first path controller 20 and the second path controller 30 are similar, only one of the first path controller 20 and the second path controller 30 will be described in detail.

The first path controller 20 includes a first comparison block 21, a first multiplexer (MUX) 22, a first latch block 23, a first tap block 24, and a first adder 25.

The first comparison block 21 is controlled by the main clock signal CLK, amplifies a difference between an input signal Vin and each of first reference voltages +H1 and −H1, and latches each of the amplified results.

Since a half-rate receiving method is used, even-numbered data may be affected by previous odd-numbered data, and odd-numbered data may be affected by previous even-numbered data. Therefore, the removal of ISI of the current data should be performed so as to compensate the state in consideration of a state (level) of the previous even-numbered or odd-numbered data.

Thus, the first MUX 22 may select any one of the result values of the first comparison block 21 based on a selected value output from a second MUX 32 of the second path controller 30 and output the selected result value.

The first latch block 23 includes a plurality of latch (LAT) units 23-1, 23-2, 23-3, 23-4, and 23-5 (e.g., latches or latch circuits). In an embodiment, the latches are D flip-flops.

Each of the plurality of latch units 23-1, 23-2, 23-3, 23-4, and 23-5 may sequentially latch previous data and at the same time, transmit the data to the first tap block 24 as a feedback by being controlled by the main clock signal CLK or the sub clock signal CLKB, and finally, output DFE even-numbered data.

The first tap block 24 includes a plurality of tap circuits, and each of the tap circuits may include a current digital to analog (DA) conversion circuit. The tap circuits include coefficients H2, H3, H4 and H5, respectively. The first tap block 24 may apply a coefficient with respect to past data which may affect a signal of the current data. Thus, the first tap block 24 determines a location corresponding to the data received as a feedback from each of the plurality of latch units 23-1, 23-2, 23-3, 23-4, and 23-5 as a tap, and provides the corresponding coefficient.

The first adder 25 adds a coefficient of the first tap block 24 to the input signal Vin. Data determined by the first comparison block 21 is delayed by latches 23-1-23-5, so that digital data signals are generated. The data signal is also received as feedback to be multiplied by a coefficient, and the adder 25 performs an addition or subtraction operation, so that ISI of Vin is removed. When the output of a latch is +1, an inverse of the coefficient it is connected to is added to Vin, and when the output of a latch is −1, the coefficient it is connected to is added to Vin. For example, if the output of each of latches 23-1 and 23-2 is +1 and the output of latches 23-3 and 23-4 is −1, then −H2 is added to Vin using H2, −H3 is added to Vin using H3, +H4 is added to Vin using H4, and +H5 is added to Vin using H5. In this way, each coefficient corresponds to the size of ISI generated by the previously input data, and ISI is removed via a feedback loop such that no ISI remains in the output of adder 25.

The second path controller 30 includes a second comparison block 31, the second MUX 32, a second latch block 33, a second tap block 34, and a second adder 35.

The second comparison block 31 is controlled by the sub clock signal CLKB, amplifies differences between the input signal Vin and each of the first reference voltages +H1 and −H1, and latches each of the amplified results.

The second MUX 32 may select any one of the results of the second comparison block 31 based on a selected value output from the first MUX 22 of the first path controller 20 and output the selected result.

The second latch block 33 includes a plurality of latch units 33-1, 33-2, 33-3, 33-4, and 33-5.

Each of the plurality of latch units 33-1, 33-2, 33-3, 33-4, and 33-5 may sequentially latch and transmit previous data by being controlled by the main clock signal CLK or the sub clock signal CLKB, and finally, output DFE odd-numbered data.

Further, the data output from each of the plurality of latch units 33-1, 33-2, 33-3, 33-4, and 33-5 is provided to the second tap block 34 as a feedback. By employing the half-rate receiving method, it is possible to reduce a feedback delay time compared to a full-rate receiving method.

The second tap block 34 may include a plurality of tap circuits, and each of the tap circuits may include a current DA conversion circuit. The tap circuits include coefficients H2, H3, H4 and H5, respectively. The second tap block 34 may apply a coefficient with respect to past data which may affect a signal of the current data. Thus, the second tap block 34 determines a location corresponding to the data received as a feedback from each of the plurality of latch units 33-1, 33-2, 33-3, 33-4, and 33-5 as a tap, and provides the corresponding coefficient.

The second adder 35 adds a coefficient of the second tap block 34 to the input signal Vin. Data determined by the second comparison block 31 is delayed by latches 33-1-33-5, so that digital data signals are generated. The data signal is also received as feedback to be multiplied by a coefficient, and the adder 35 performs an addition or subtraction operation, so that ISI of Vin is removed. When the output of a latch is +1, an inverse of the coefficient it is connected to is added to Vin, and when the output of a latch is −1, the coefficient it is connected to is added to Vin. For example, if the output of each of latches 33-1 and 33-2 is +1 and the output of latches 33-3 and 33-4 is −1, then −H2 is added to Vin using H2, −H3 is added to Vin using H3, +H4 is added to Vin using H4, and +H5 is added to Vin using H5. In this way, each coefficient corresponds to the size of ISI generated by the previously input data, and ISI is removed via a feedback loop such that no ISI remains in the output of adder 35.

Operations of the look-ahead DFE 10 will be described with reference to FIGS. 4, 5A, and 5B in detail.

Figure 4:
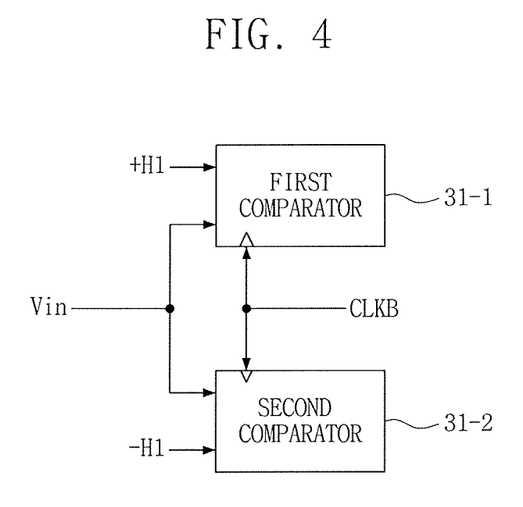
FIG. 4 is a block diagram showing an embodiment of a second comparison block shown in FIG. 3.

FIG. 4 is a block diagram of an embodiment of the second comparison block 31 shown in FIG. 3.

Referring to FIG. 4, the second comparison block 31 includes a first comparator 31-1 and a second comparator 31-2 (e.g., comparator circuits). The first reference voltages +H1 and −H1 includes a first main reference voltage +H1 and a first sub reference voltage −H1. In an embodiment, the first main reference voltage +H1 has a same magnitude as the first sub reference voltage −H1.

The first comparator 31-1 compares the input signal Vin with the first main reference voltage +H1.

The second comparator 31-2 compares the input signal Vin with the first sub reference voltage −H1.

The second comparison block 31 may be controlled by the sub clock signal CLKB, and may make two decisions based on a determination of data with respect to the input signal Vin and each of the first main reference voltage +H1 and the first sub reference voltage −H1 each half-clock cycle.

Figure 5A:
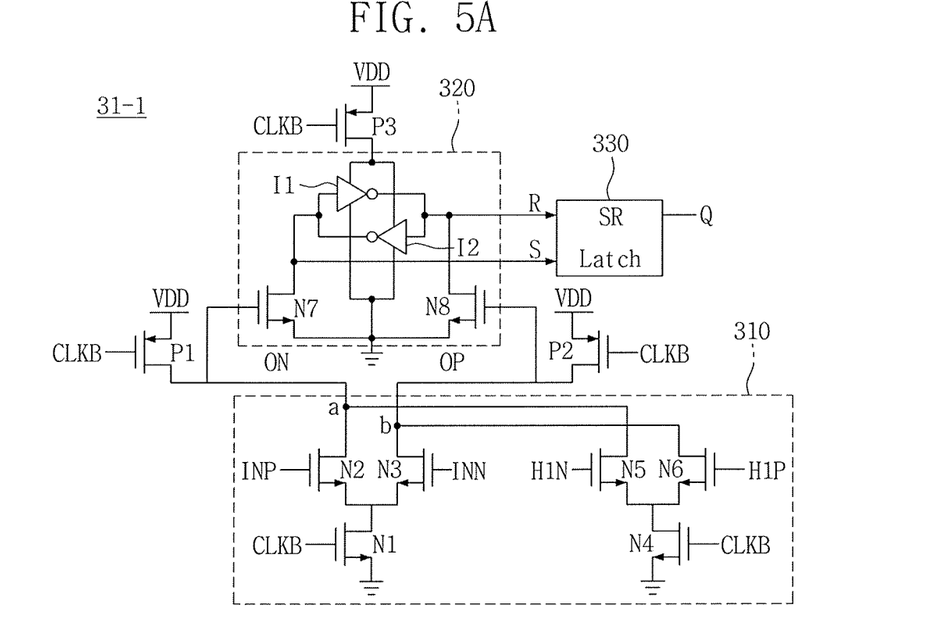
FIG. 5A is an embodiment of a circuit diagram of a first comparator shown in FIG. 4.

FIG. 5A is an embodiment of a circuit diagram of the first comparator 31-1 according to FIG. 4.

Referring to FIG. 5A, the first comparator 31-1 includes a differential input unit 310, an amplifier 320, and a latch unit 330.

The differential input unit 310 receives the input signal Vin and a first reference voltage +H1, which is a differential signal.

The input signal Vin may be defined by a main signal INP and sub signal INN of the differential signal, and the first reference voltage +H1 may be defined by voltages H1P and H1N of which voltage values are substantially the same, with only the signs different from each other.

The differential input unit 310 includes first to sixth NMOS transistors N1 to N6. The second NMOS transistor N2 and the third NMOS transistor N3 receive the main signal INP and sub signal INN of the differential signal, respectively. The main signal INP and the sub signal INN are complementary signals. The fifth NMOS transistor N5 and the sixth NMOS transistor N6 receive the voltages H1P and H1N, respectively. The voltages H1P and H1N are complementary signals.

Drains of the second NMOS transistor N2 and the fifth NMOS transistor N5 are commonly connected to a node a. Drains of the third NMOS transistor N3 and the sixth NMOS transistor N6 are commonly connected to a node b.

The differential input unit 310 compares sizes of the input signal Vin and the first reference voltage H1.

The amplifier 320 includes a seventh NMOS transistor N7 and an eighth NMOS transistor N8, and two inverters I1 and I2.

The amplifier 320 detects a result of the comparison in the differential input unit 310, and amplifies a level of the result to generate an amplified result.

The latch unit 330 latches the amplified result output by the amplifier 320. The latch unit 330 may include an SR latch circuit.

As shown in FIG. 5A, first to third PMOS transistors P1 to P3 are controlled by the sub clock signal CLKB, and provide a power voltage VDD.

In the operation of the first comparator 31-1, the first comparator 31-1 determines whether the input signal Vin is greater than the first reference voltage +H1 or not. Then, when the input signal Vin is greater than the first reference voltage +H1, the amplifier 320 amplifies the input signal Vin to a high level amplified signal and the latch unit 330 latches the high level amplified signal.

When the input signal Vin is smaller than the first reference voltage +H1, the amplifier 320 amplifies the input signal Vin to a low level and the latch unit 330 latches the amplified signal.

Even when the second comparator 31-2 is enabled with a similar principle as the first comparator 31-1, the second comparator 31-2 determines whether the input signal Vin is greater than the first sub reference voltage −H1 or not.

Figure 5B:
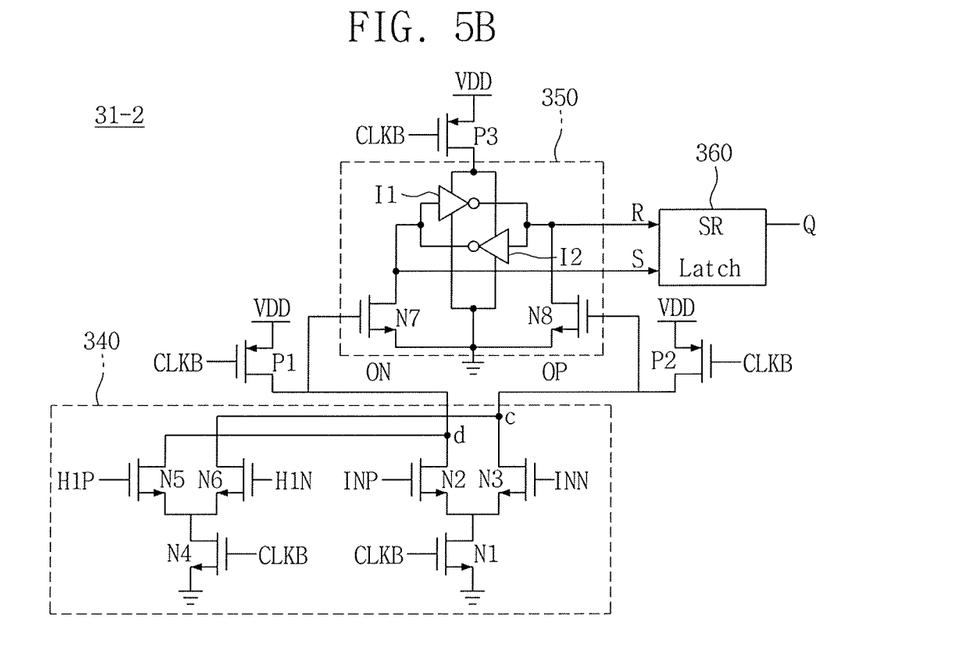
FIG. 5B is an embodiment of a circuit diagram of a second comparator shown in FIG. 4.

A configuration of the second comparator 31-2 is shown in FIG. 5B.

Referring to FIG. 5B, the second comparator 31-2 includes a differential input unit 340, an amplifier 350, and a latch unit 360.

The differential input unit 340 receives the input signal Vin and the first sub reference voltage −H1. The differential input unit 340 receives the input signal Vin and the first sub reference voltage as differential signals.

The differential input unit 340 includes first to sixth NMOS transistors N1 to N6. The second NMOS transistor N2 and the third NMOS transistor N3 receive a main signal INP and sub signal INN of the differential signal, respectively. The main signal INP and the sub signal INN are complementary signals. The fifth NMOS transistor N5 and the sixth NMOS transistor N6 receive voltages H1P and H1N, respectively. The first sub reference voltage −H1 may be defined by H1P and H1N, which are complementary signals.

Drains of the second NMOS transistor N2 and the fifth NMOS transistor N5 are commonly connected to a node d. Drains of the third NMOS transistor N3 and the sixth NMOS transistor N6 are commonly connected to a node c.

The amplifier 350 includes a seventh NMOS transistor N7, an eighth NMOS transistor N8, and two inverters I1 and I2.

The amplifier 350 detects a result of the comparison in the differential input unit 340 and amplifies a level of the result to generate an amplified result.

The latch unit 360 latches the amplified result output by the amplifier 350. The latch unit 360 may include an SR latch circuit.

In the operation of the second comparator 31-2, the second comparator 31-2 determines whether the input signal Vin is greater than the negative (−) first sub reference voltage −H1 or not. Then, when the input signal Vin is greater than the negative first sub reference voltage −H1, the amplifier 350 amplifies the input signal Vin to a high level and the latch unit 360 latches the amplified signal.

When the input signal Vin is smaller than the first sub reference voltage −H1, the amplifier 350 amplifies the input signal Vin to a low level amplified signal and the latch unit 360 latches the low level amplified signal.

That is, the first comparator 31-1 and the second comparator 31-2 determine whether the input signal Vin is greater than the positive (+) first reference voltage +H1 or not and whether the input signal Vin is greater than the negative first sub reference voltage −H1 or not, respectively.

There are two decisions, and the selection of one from the two decisions may be determined by a level value of the previous data.

For example, when output of the previous even-numbered data is a high level, current odd-numbered data may be selected according to the comparison result of the first comparator 31-1. Then, the second MUX 32 (see FIG. 3) may select the current odd-numbered data according to whether the comparison result of the first comparator 31-1 is higher than the positive first reference voltage +H1 or not.

On the contrary, when output of the previous even-numbered data is a low level, the current odd-numbered data may be selected according to the comparison result of the second comparator 31-2. Then, the second MUX 32 (see FIG. 3) may select the current odd-numbered data according to whether the comparison result of the first comparator 31-1 is higher than the negative first sub reference voltage −H1 or not.

Thus, in general, the look-ahead DFE 10 determines whether the current input signal Vin is greater than predetermined first reference voltages +H1 and −H1 or not, and then the look-ahead DFE 10 may reduce and compensate by a predetermined value by detecting that it is increased due to an effect of the past data when the current input signal Vin is greater than the predetermined first reference voltages +H1 and −H1, and may increase and compensate by the predetermined value by detecting that it is decreased due to an effect of the past data when the current input signal Vin is smaller than the predetermined first reference voltages +H1 and −H1. Further, the look-ahead DFE 10 may apply the coefficient using the plurality of tap circuits so that a residual effect of pieces of past data before one cycle is removed.

Figure 6:
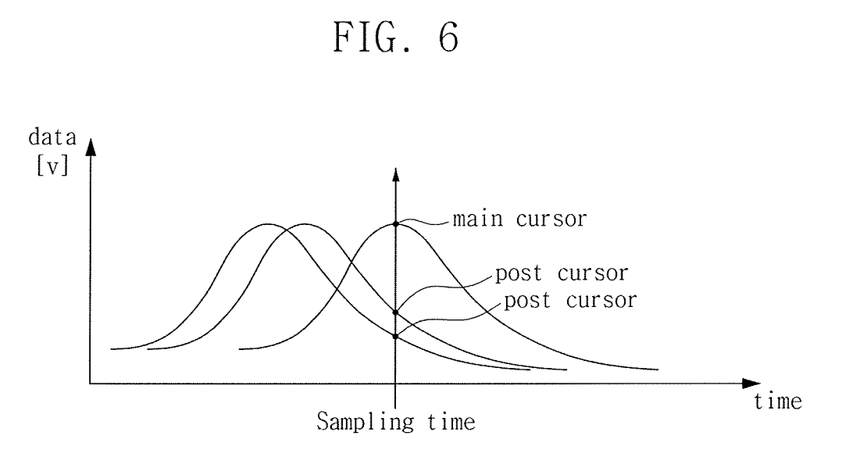
FIG. 6 is a graph showing a relationship between past data and current data.

FIG. 6 is a graph showing a relationship between the past data and the current data.

Referring to FIG. 6, an X-axis denotes time and a Y-axis denotes a voltage level of data.

The current data sampled in a sampling time may be referred to as a main cursor. However, the current data is affected by a long tail of pieces of past data, and the long tail of the pieces of past data may be referred to as a post cursor.

For convenience of description, both the current data and the past data are illustrated to be a high level, and thus, an effect of the post cursor on the main cursor is referred to as ISI.

In general, signal ISI may be removed using the look-ahead DFE 10. Thus, the ISI corresponding to a location of first previous data may be removed using the look-ahead DFE 10, and the ISI corresponding to locations of pieces of residual past data may be removed using the tap circuits of the tap block. However, in such a structure, when a tap is added to elaborately correct the signal, a current conversion circuit should be added to the tap block. However, it may be disadvantageous in terms of power consumption as well as an area of the overall circuit when the current conversion circuit is added.

Figure 7:
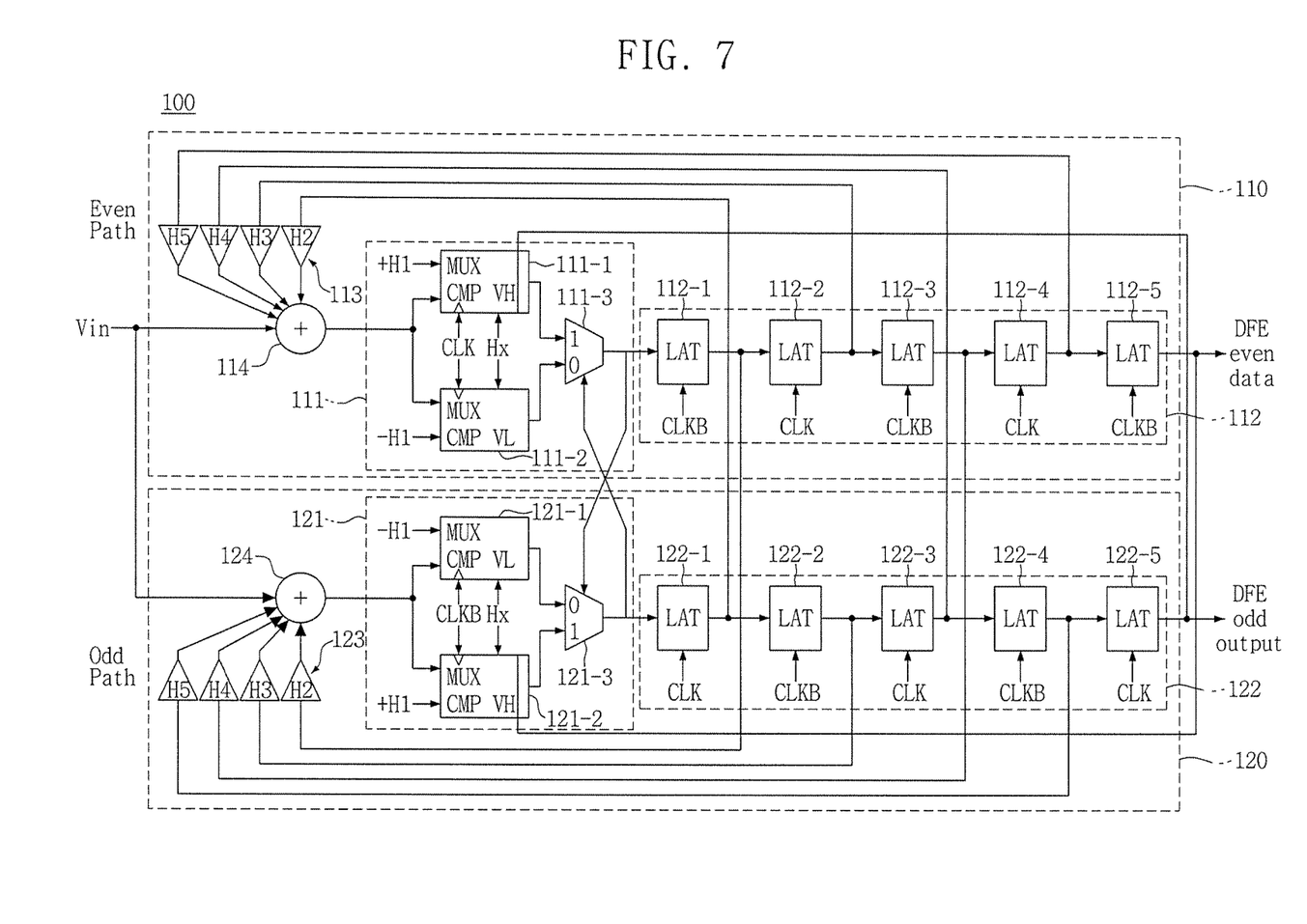
FIG. 7 is a block diagram of a tap embedded look-ahead DFE according to an exemplary embodiment of the inventive concept.

FIG. 7 is a block diagram of a tap embedded look-ahead DFE 100 in according to an exemplary embodiment of the inventive concept.

Referring to FIG. 7, the tap embedded look-ahead DFE 100 includes a first path controller 110 and a second path controller 120.

The tap embedded look-ahead DFE 100 according to the exemplary embodiment of the inventive concept illustrates a half-rate receiving method using a main clock signal CLK and sub clock signal CLKB of a clock signal, and the first path controller 110 and the second path controller 120 may be provided to support the method. In an embodiment, the main clock signal CLK and sub clock signal CLKB are inverses of one another.

Since operational and structural principles of the first path controller 110 and the second path controller 120 are similar, only one of the first path controller 110 and the second path controller 120 will be described in detail.

The first path controller 110 includes a first sampler 111 (e.g., a first sampler circuit), a first latch block 112 (e.g., a first latch circuit), a first tap block 113 (e.g., a first tap circuit), and a first adder 114 (e.g., a summer). In an embodiment, the first sampler 111 performs the function of a sample and hold circuit that samples a voltage of a continuously varying analog signal and holds its value at a constant level for a specified minimum period of time.

The first sampler 111 is controlled by the main clock signal CLK, receives a reference voltage Hx of $x^{th}$ data as well as an input signal Vin and first reference voltages +H1 and −H1, and then determines an offset voltage of the current data. Specifically, the first sampler 111 receives the $x^{th}$ data Dx as a feedback signal.

That is, the first sampler 111 according to an exemplary embodiment of the inventive concept determines ISI compensation in consideration of a state of the $x^{th}$ data as well as that of previous data with respect to current input data. The $x^{th}$ data Dx received as a feedback signal may be transmitted to a tap receiver which is embedded inside the first sampler 111 and may participate in the ISI compensation with the tap circuit.

The first sampler 111 includes a first tap embedded sampler 111-1, a second tap embedded sampler 111-2, and a first MUX 111-3.

The first tap embedded sampler 111-1 and the second tap embedded sampler 111-2 determine whether the input signal Vin is greater than a positive first reference voltage +H1 or not and whether the input signal Vin is greater than a negative first reference voltage −H1 or not, respectively. In this case, circuit operations of the first tap embedded sampler 111-1 and the second tap embedded sampler 111-2 may be differently controlled according to the state of the $x^{th}$ data. Descriptions thereof will be described below. Further, selections of the first tap embedded sampler 111-1 and the second tap embedded sampler 111-2 may be changed by the corresponding data, for example, the second path controller 120 which is an odd-numbered data path.

Since a half-rate receiving method is used, even-numbered data may be affected by previous odd-numbered data, and on the contrary, odd-numbered data may be affected by previous even-numbered data. Therefore, the removal of ISI of the current data should be performed so as to compensate the state in consideration of a state (level) of the previous even-numbered or odd-numbered data. Thus, the first MUX 111-3 may select any one of the result values of the first tap embedded sampler 111-1 and the second tap embedded sampler 111-2 based on a selected value output by a second MUX 121-3 of the second path controller 120 and output the selected result value.

The first latch block 112 includes a plurality of latch units 112-1, 112-2, 112-3, 112-4, and 112-5 (e.g., latches, latch circuits).

Each of the plurality of latch units 112-1, 112-2, 112-3, 112-4, and 112-5 may sequentially latch and transmit previous data by being controlled by the main clock signal CLK or the sub clock signal CLKB, and finally, output DFE even-numbered data.

The first tap block 113 may include a plurality of tap circuits, and each of the tap circuits may include a current DA conversion circuit. The tap circuits include coefficients H2, H3, H4 and H5, respectively. The first tap block 113 may apply a coefficient with respect to past data, which may affect a signal of the current data. Thus, the first tap block 113 determines a location corresponding to the data received as a feedback signal from each of the plurality of latch units 112-1, 112-2, 112-3, 112-4, and 112-5, and provides the corresponding coefficient.

The first adder 114 adds a coefficient of the first tap block 113 to the input signal Vin. In an embodiment, the first adder 114 adds all coefficients H2-H5 of the first tap block 113 to the input signal Vin.

The second path controller 120 includes a second sampler 121 (e.g., a second sampler circuit), a second latch block 122

(e.g., a second latch circuit), a second tap block 123 (e.g., a second tap circuit), and a second adder 124 (e.g., a summer).

The second sampler 121 is controlled by the sub clock signal CLKB, receives the reference voltage Hx of the $x^{th}$ data as well as the input signal Vin and the first reference voltages +H1 and −H1, and then determines an offset voltage of the current data.

That is, the second sampler 121 in accordance with an exemplary embodiment of the inventive concept determines ISI compensation in consideration of a state of the $x^{th}$ data as well as that of previous data with respect to current input data.

The second sampler 121 includes a third tap embedded sampler 121-1, a fourth tap embedded sampler 121-2, and the second MUX 121-3.

The third tap embedded sampler 121-1 and the fourth tap embedded sampler 121-2 determine whether the input signal Vin is greater than the first sub reference voltage −H1 or not and whether the input signal Vin is greater than the first main reference voltage +H1 or not, respectively. In this case, circuit operations of the third tap embedded sampler 121-1 and the fourth tap embedded sampler 121-2 may be differently controlled according to the $x^{th}$ data.

The second MUX 121-3 may select any one of the result values of the third tap embedded sampler 121-1 and the fourth tap embedded sampler 121-2 based on a selected value output by the first MUX 111-3 of the first path controller 110 and output the selected result value.

The second latch block 122 includes a plurality of latch units 122-1, 122-2, 122-3, 122-4, and 122-5.

Each of the plurality of latch units 122-1, 122-2, 122-3, 122-4, and 122-5 may sequentially latch and transmit previous data by being controlled by the main clock signal CLK or the sub clock signal CLKB, and finally, output DFE odd-numbered data.

The second tap block 123 includes a plurality of tap circuits, and each of the tap circuits may include a current DA conversion circuit. The tap circuits include coefficients H2, H3, H4 and H5, respectively. The second tap block 123 may apply a coefficient with respect to past data, which may affect a signal of the current data. Thus, the second tap block 123 determines a location corresponding to data received as a feedback signal from each of the plurality of latch units 122-1, 122-2, 122-3, 122-4, and 122-5, and provides the corresponding coefficient.

The second adder 124 adds a coefficient of the second tap block 123 to the input signal Vin. In an embodiment, the second adder 124 adds all the coefficients H2-H5 of the second tap block to the input signal Vin.

Operations of the second sampler 121 will be described with reference to FIGS. 8A and 8B in detail.

Figure 8A:
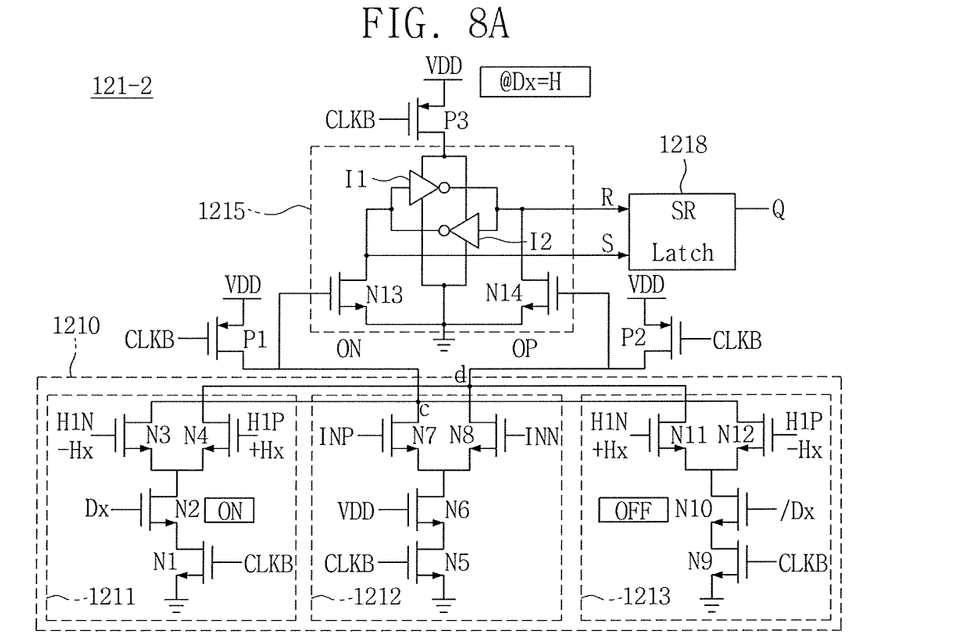
FIGS. 8A and 8B are circuit diagrams of a fourth tap embedded sampler shown in FIG. 7 according to exemplary embodiment of the inventive concept.
Figure 8B:
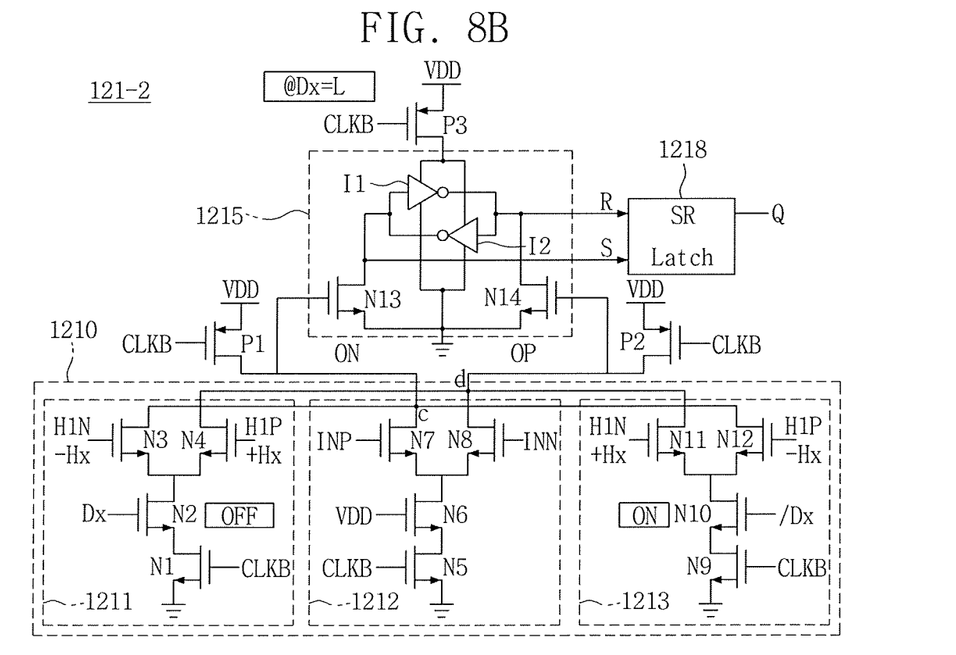

FIGS. 8A and 8B are circuit diagrams of the fourth tap embedded sampler 121-2 shown in FIG. 7 according to an exemplary embodiment of the inventive concept. Hx in FIGS. 8A and 8B is a value corresponding to ISI of an Xth post cursor. Therefore, when Hx is added or is subtracted is determined by Dx (i.e., the xth data). FIG. 8A illustrates a circuit configuration in a case in which Dx is +1 (i.e., a high value), and FIG. 8B illustrates a circuit configuration in a case in which Dx is −1 (i.e., a low value). Hx is contained in four reference voltages. Hx is part of H1P+Hx, H1P−Hx, H1N+Hx, and H1N−Hx, and the four reference voltages are generated by an external reference voltage generator, which may be determined by an algorithm that selects optimized voltages capable of removing the first post cursor and the xth post cursor.

FIG. 8A shows when the $x^{th}$ data Dx is a high level and FIG. 8B shows when the $x^{th}$ data Dx is a low level. In an embodiment of FIG. 7, the output of 112-5 in FIG. 7 is fedback to 121-2, and the output of 122-5 in FIG. 7 is fedback to 111-1.

First, referring to FIG. 8A, the fourth tap embedded sampler 121-2 includes a differential input unit 1210, an amplifier 1215, and a latch unit 1218.

The differential input unit 1210 receives an input signal Vin, a first main reference voltage +H1, and an $x^{th}$ reference voltage Dx, which are differential signals.

The input signal Vin may be defined by a main signal INP and a sub signal INN of the differential signal, and a first main reference voltage +H1 may be defined by voltages H1P and H1N of which voltage values (e.g., magnitudes) are substantially the same, with only the signs different from each other. Further, $x^{th}$ data Dx may be received as a high level or a low level.

The differential input unit 1210 includes a first receiver 1211, a second receiver 1212, and a third receiver 1213. Here, even when the first receiver 1211 and the third receiver 1213 are enabled as types of tap receivers, they have only different levels of the data to be received. The second receiver 1212 may be referred to as a receiver of the input signal Vin.

The first receiver 1211 includes first to fourth NMOS transistors N1 to N4.

The first NMOS transistor N1 receives the sub clock signal CLKB, the second NMOS transistor N2 receives the $x^{th}$ data Dx, and the third and fourth NMOS transistors N3 and N4 receive voltages calculated by H1N−Hx and H1P+Hx as complementary signals, respectively. It may be a level preset by the designer, and a value preset in consideration of a location and state of the $x^{th}$ data Dx. Therefore, Hx may be considered a reference voltage corresponding to the $x^{th}$ data Dx.

The second receiver 1212 includes fifth to eighth NMOS transistors N5 to N8.

The fifth NMOS transistor N5 receives the sub clock signal CLKB, the sixth NMOS transistor N6 receives a power voltage VDD, and the seventh and eighth NMOS transistors N7 and N8 receive the main signal INP and the sub signal INN of the differential signal as complementary signals, respectively.

The third receiver 1213 includes ninth to twelfth NMOS transistors N9 to N12.

The ninth NMOS transistor N9 receives the sub clock signal CLKB, the tenth NMOS transistor N10 receives an inverted level /DX of the $x^{th}$ reference voltage, and the eleventh and twelfth NMOS transistors N11 and N12 receive voltages H1N+Hx and H1P−Hx as complementary signals, respectively. The inverted level /DX is an inverted data DX signal. In the same way, it may be a level preset by the designer, and a value preset in consideration of a location and state of the $x^{th}$ data Dx. Therefore, the Hx may be considered as a reference voltage corresponding to the $x^{th}$ data Dx.

Drains of the third NMOS transistor N3, the seventh NMOS transistor N7, and the twelfth NMOS transistor N12 are connected to a common node c.

Drains of the fourth NMOS transistor N4, the eighth NMOS transistor N8, and the eleventh NMOS transistor N11 are connected to a common node d.

The differential input unit 1210 may differently control an operational path, in which sizes of the input signal Vin and the first reference voltage H1 and the $x^{th}$ reference voltage Hx are compared, according to the level of the $x^{th}$ data Dx. That is, when the level of the $x^{th}$ data Dx is a high level, the third receiver 1213 is turned off, and the first receiver 1211 and the second receiver 1212 are enabled (e.g., turned on).

The amplifier 1215 includes a thirteenth NMOS transistor N13, a fourteenth NMOS transistor N14, and two inverters I1 and I2.

The amplifier 1215 detects a comparison result of the differential input unit 1210 and amplifies a level of the comparison result to generate an amplified result.

The latch unit 1218 latches the amplified result output by the amplifier 1215. The latch unit 1218 may include an SR latch circuit.

As shown in FIG. 8A, first to third PMOS transistors P1 to P3 are controlled by the sub clock signal CLKB, and provides a power supply voltage VDD.

When the level of the $x^{th}$ data Dx is a high level and the input signal Vin is greater than a voltage applied to the first receiver 1211, the amplifier 1215 amplifies the input signal Vin to a high level and the latch unit 1218 latches the amplified signal.

In an exemplary embodiment, an operation of the fourth tap embedded sampler 121-2 is expressed by the following Expression 1.

$$(INP-INN)-((H1N-Hx)-(H1P+Hx))>0, \text{ when } Dx=H \quad \text{[Expression 1]}$$

In Expression 1, Vin is defined as INP−INN and V1 is defined as H1P−H1N.

Using the above definitions of Vin and V1, Expression 1 is simplified to Expression 2 below.

$$Vin-V1-2Hx>0 \quad \text{[Expression 2]}$$

It is assumed that 2Hx is Vx for convenience of description.

Therefore, when Vin−V1−Vx>0, it may be output as a high level through the amplifier 1215 and the latch unit 1218.

That is, when even-numbered data which is previous data is a high level, the fourth tap embedded sampler 121-2 is enabled, and when the level of the $x^{th}$ data Dx is a high level, the first and second receivers 1211 and 1212 of the fourth tap embedded sampler 121-2 are enabled.

FIG. 8B shows when the $x^{th}$ data Dx is a low level in contrast to FIG. 8A.

In FIG. 8B, when the level of the $x^{th}$ data Dx is a low level, the first receiver 1211 is turned off and the third receiver 1213 is enabled.

Thus, when the level of the $x^{th}$ data Dx is a low level, the second and third receivers 1212 and 1213 are enabled, and voltage sizes thereof may be compared.

When the input signal Vin is greater than a voltage applied to the third receiver 1213, the amplifier 1215 amplifies the input signal Vin to a low level and the latch unit 1218 latches the amplified signal.

In an exemplary embodiment, an operation of the fourth tap embedded sampler 121-2 is expressed by the following Expression 3.

$$(INP-INN)-((H1N+Hx)-(H1P-Hx))>0, \text{ when } Dx=L \quad \text{[Expression 3]}$$

In Expression 3, Vin is defined as INP−INN, and V1 is defined as H1P−H1N.

Using the above definitions, Expression 3 is simplified to Expression 4 below.

$$Vin-V1+Vx>0 \quad \text{[Equation 4]}$$

The fourth tap embedded sampler 121-2 does not unconditionally determine whether the input signal Vin is greater than the V1 or not, but compares the input signal Vin with a value including the reference voltage in consideration of the reference voltage according to the level of $x^{th}$ data.

Although not described herein, the third tap embedded sampler 121-1 also includes structural and operational principles similar to the fourth tap embedded sampler 121-2.

Further, the first tap embedded sampler 111-1 and the second tap embedded sampler 111-2 also include structural and operational principles similar to the fourth tap embedded sampler 121-2. In order to avoid repeated descriptions, only the fourth tap embedded sampler 121-2 has been described in detail.

Thus, according to at least one embodiment of the inventive concept, since an additional tap is used, ISI of the data may be more finely and precisely removed.

However, when the additional tap is used, it may be implemented by embedding the tap in the look-ahead sampler instead of adding the tap to the first tap block 113 or the second tap block 123 using a current DA conversion circuit.

That is, in another technique as described above, ISI corresponding to a location of first previous data should be removed using the first sampler 111, and pieces of residual past data should be removed using the first tap block 113. To consider an additional tap, a tap circuit had to be added to the first tap block 113. The tap circuit is a current conversion circuit and has a large area and power consumption.

However, according to at least one embodiment of the inventive concept, the ISI corresponding to a location of predetermined data of pieces of past data may be removed using the tap circuits of the first tap block 113. Further, to consider the additional tap, ISI compensation may be applied to the first sampler 111 as a feedback signal. Thus, it may use a small area of the circuit. Further, power consumption may be prevented from consuming more current.

Figure 9:
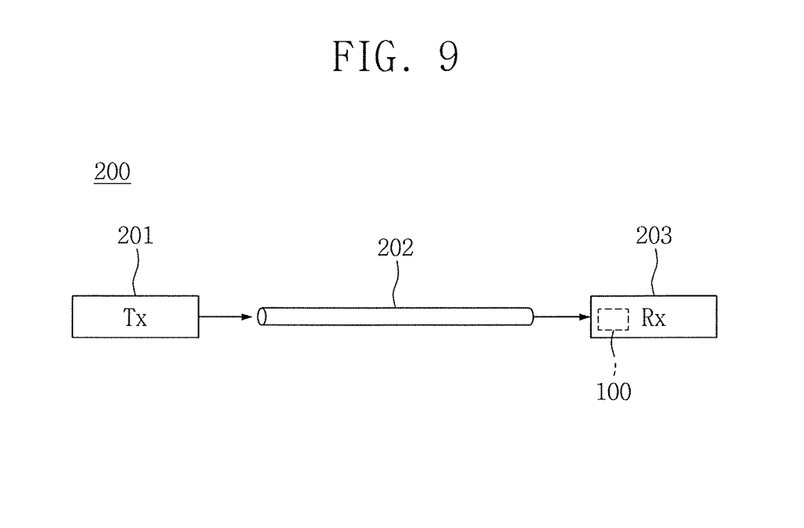
FIG. 9 is a block diagram of a data transmission system having the tap embedded look-ahead DFE shown in FIG. 7 according to an exemplary embodiment of the inventive concept.

FIG. 9 is a block diagram of a data transmission system 200 having the tap embedded look-ahead DFE 100 shown in FIG. 7.

Referring to FIG. 9, a transmission channel 202 is provided between a transmitter (Tx) 201 and a receiver (Rx) 203.

When data is transmitted from the Tx 201 to the Rx 203, the data may be transmitted through the transmission channel 202.

The tap embedded look-ahead DFE 100 may be included in the Rx 203. Thus, as the tap embedded look-ahead DFE 100 transmits an additional tap of $x^{th}$ data to an embedded sampler circuit as a feedback, ISI of the received signal may be finely removed and compensated and a characteristic of the signal can be improved. The tap embedded look-ahead DFE 100 may include the tap embedded look-ahead DFE 100 shown in FIG. 7.

Figure 10:
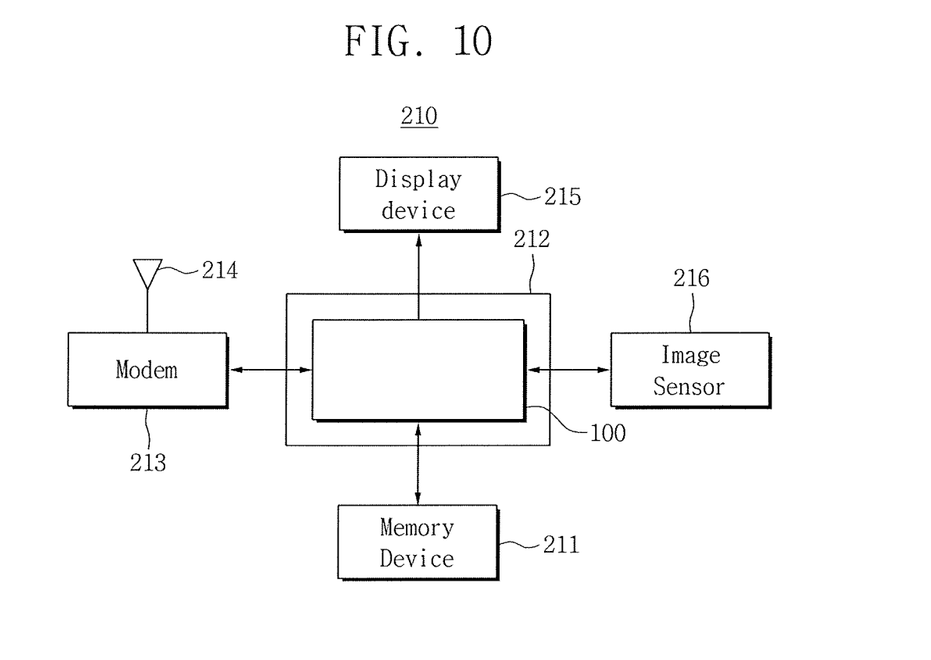
FIG. 10 is a block diagram of a mobile device having the tap embedded look-ahead DFE shown in FIG. 7 according to an exemplary embodiment of the inventive concept.

FIG. 10 is a block diagram of a mobile device 210 having the tap embedded look-ahead DFE 100 shown in FIG. 7.

Referring to FIG. 10, the mobile device 210 may be implemented as a smart-phone, a tablet PC, an ultra mobile personal computer (UMPC), a personal digital assistant (PDA), a portable multimedia player (PMP), an MP3 player, or an MP4 player.

The mobile device 210 may include a memory device 211, an application processor 212 including a memory controller which controls the memory device 211, a modem 213, an antenna 214, a display device 215, and an image sensor 216.

The modem 213 may transmit and receive a wireless signal through the antenna 214. For example, the modem 213 may change the wireless signal received through the antenna 214 to a signal to be processed in the application processor 212. In an embodiment of the inventive concept, the modem 213 is a long term evolution (LTE) transceiver, a high speed downlink packet access/wideband code division multiple access (HSDPA/WCDMA) transceiver, or a global system for mobile communications (GSM) transceiver.

Therefore, the application processor 212 may process the signal output from the modem 213, and transmit the processed signal to the display device 215. Further, the modem 213 may change the signal output from the application processor 212 to the wireless signal, and output the changed wireless signal to an external device through the antenna 214.

The image sensor 216 receives images through a lens. Therefore, the application processor 212 receives the images from the image sensor 216, and processes signals of the received images. The application processor 212 includes the tap embedded look-ahead DFE 100 in accordance with an embodiment of the inventive concept. The tap embedded look-ahead DFE 100 may finely remove and compensate ISI of the received signals, and thus may improve a characteristic of the signal. The tap embedded look-ahead DFE 100 may include the tap embedded look-ahead DFE 100 shown in FIG. 7.

A decision feedback equalizer according to at least one embodiment of the inventive concept includes an additional tap, and thus area efficiency can be improved and power consumption can be reduced while fine adjustment of ISI of data is possible.

At least one embodiment of inventive concept can be applied to a DFE sampler, and specifically, an interface circuit.

While some exemplary embodiments of the inventive concept have been described in detail above, it should be understood that various changes, substitutions and alterations may be made herein without departing from the scope of the inventive concept.

What is claimed is:

1. A data receiver comprising:
    a first path controller amplifies a first difference between a first reference voltage and an input voltage, amplifies a second difference between a second reference voltage and the input voltage, and selects one of the first and second differences for output as even data using odd data; and
    a second path controller amplifies a third difference between the first reference voltage and the input voltage, amplifies a fourth difference between the second reference voltage and the input voltage, and selects one of the third and fourth differences for output as the odd data using the even data,
    wherein the first path controller is controlled by a main clock signal and the second path controller is controlled by an inverse of the main clock signal.

2. The data receiver of claim 1, wherein each path controller comprises:
    a pair of first transistors configured to receive a difference between the first reference voltage and the second reference voltage;
    a pair of second transistors configured to receive a difference of the input voltage; and
    a pair of third transistors configured to receive the difference between the first reference voltage and the second reference voltage,
    wherein the pair of the first transistors and the pair of the second transistors are alternately enabled according to a level of the second data.

3. The data receiver of claim 2, wherein each path controller further comprises:
    an amplifier configured to detect a comparison result of each pair of the transistors; and
    a latch unit.

4. The data receiver of claim 3, wherein the amplifier comprises a plurality of transistors and inverters.

5. The data receiver of claim 3, wherein the latch unit comprises an SR latch circuit.

6. A data transmission system comprising:
    a transmitter configured to transmit data;
    a receiver configured to receive data; and
    a data transmission channel provided between the transmitter and the receiver,
    wherein the receiver comprises:
        a first path controller comprising a first sampler controlled by a main clock signal, the first sampler receiving an $n^{th}$ reference voltage of $n^{th}$ data, an input signal and a first reference voltage to determine an offset voltage of current data; and
        a second path controller comprising a second sampler controlled by an inverse of the main clock signal, the second sampler receiving the $n^{th}$ reference voltage, the input signal and the first reference voltage to determine the offset voltage.

7. The system of claim 6,
    wherein the first path controller is configured to control output of even-numbered data, and
    wherein the second path controller is configured to control output of odd-numbered data.

8. The system of claim 7, wherein the first path controller further comprises:
    a first latch block configured to latch and transmit an output of the first sampler;
    a first tap block configured to receive an output of the first latch block as a feedback signal and including a coefficient according to a location of each data; and
    a first adder configured to add all output of the first tap block.

9. The system of claim 7, wherein the second path controller comprises:
    a second latch block configured to latch and transmit output of the second sampler,
    a second tap block configured to receive output of the second latch block as a feedback signal and including a coefficient according to a location of each data; and
    a second adder configured to add all output of the second tap block.

10. The system of claim 8, wherein the first sampler comprises:
    a first tap embedded sampler and a second tap embedded sampler which are controlled and selected by an output signal of the second path controller; and
    a first multiplexer configured to select one output among outputs of the first and second tap embedded samplers.

11. The system of claim 9, wherein the second sampler comprises:
    a third tap embedded sampler and a fourth tap embedded sampler which are controlled and selected by an output signal of the first path controller; and
    a second multiplexer configured to select one output among outputs of the third and fourth tap embedded samplers.

12. The system of claim 10, wherein each of the first and second tap embedded samplers comprises:

first and second tap receivers configured to receive the $n^{th}$, wherein one of the first and second tap receivers receives an inversed level of the other; and an input signal receiver configured to receive the input signal, wherein one of the first and second tap receivers and the input signal receiver are enabled according to the level of the $n^{th}$ data.

13. The system of claim 12, wherein each of the first and second tap receivers receive a difference between the first reference voltage and the $n^{th}$ reference voltage of the $n^{th}$ data.

14. The system of claim 11, wherein each of the third and fourth tap embedded samplers comprises:

third and fourth tap receivers configured to receive the $n^{th}$ data, wherein one of the third and fourth tap receivers receive an inversed level of the other, and an input signal receiver configured to receive the input signal, wherein one of the third and fourth tap receivers and the input signal receiver are enabled according to the level of the $n^{th}$.

15. The system of claim 14, wherein each of the third and fourth tap receivers receive a difference between the first reference voltage and the $n^{th}$ reference voltage of the $n^{th}$ data.

16. A sampler comprising:

a differential input unit comprising a first receiver, a second receiver, and a third receiver; and an amplifier amplifying an output of the differential input unit to generate an amplified result, wherein the third receiver turns off and the first and second receivers turn on, in response to receipt of a data signal of a high level, and wherein the third receiver turns on and the first and second receiver turn off, in response to receipt of the data signal of the low level, wherein the sampler applies the data signal to the first receiver and an inverted version of the data signal to the third receiver, wherein the sampler applies a differential input signal to the second receiver, and wherein the sampler applies a differential reference voltage to the first receiver and the third receiver.

17. The sampler of claim 16, wherein the latch unit is a SR latch circuit.

* * * * *